United States Patent
Robinson

(10) Patent No.: US 8,373,894 B2
(45) Date of Patent: Feb. 12, 2013

(54) SYSTEM AND METHOD FOR SELECTING A PROOF PRINTER FOR A GIVEN PRODUCTION PRINTER

(75) Inventor: David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1108 days.

(21) Appl. No.: 11/430,392

(22) Filed: May 9, 2006

(65) Prior Publication Data

US 2007/0263237 A1   Nov. 15, 2007

(51) Int. Cl.
*G06F 15/00* (2006.01)

(52) U.S. Cl. .......................................... 358/1.9

(58) Field of Classification Search ............. 358/1.9, 358/518, 527
See application file for complete search history.

(56) References Cited

U.S. PATENT DOCUMENTS

| | | | |
|---|---|---|---|
| 5,293,539 A | 3/1994 | Spence | |
| 5,367,673 A | 11/1994 | Goldsmith et al. | |
| 6,043,909 A | 3/2000 | Holub | |
| 6,157,735 A | 12/2000 | Holub | |
| 6,480,299 B1 | 11/2002 | Drakopoulos et al. | |
| 6,549,654 B1 * | 4/2003 | Kumada | 382/162 |
| 6,607,258 B2 | 8/2003 | Jodra et al. | |
| 6,707,931 B2 | 3/2004 | Herbert | |
| 6,750,992 B1 | 6/2004 | Holub | |
| 6,995,870 B2 | 2/2006 | Holub | |
| 7,352,491 B2 * | 4/2008 | Bala et al. | 358/2.1 |
| 2002/0008880 A1 | 1/2002 | Dewitte et al. | |
| 2002/0159081 A1 * | 10/2002 | Zeng | 358/1.9 |
| 2003/0117639 A1 | 6/2003 | Milton et al. | |
| 2005/0083346 A1 * | 4/2005 | Takahashi et al. | 345/600 |
| 2007/0095235 A1 * | 5/2007 | Nielsen et al. | 101/483 |

* cited by examiner

*Primary Examiner* — Benny Q Tieu
*Assistant Examiner* — Jeremiah Bryar
(74) *Attorney, Agent, or Firm* — Kermit D. Lopez; Luis M. Ortiz; Melissa Asfahani

(57) ABSTRACT

A method for selecting a printing device for printing a proof is provided. The method entails providing a production printer and a plurality of remote proof printers and computing a native color gamut covered by the production printer and the plurality of remote proof printers. The method includes calculating a gamut intersection volume between the production printer and the plurality of remote proof printers and comparing the gamut intersection volume between the production printer and the plurality of remote proof printers. The method further include presenting a rating of the plurality of proof printers, the rating configured to provide data pertaining to the gamut intersection volume difference between each of the plurality of proof printers and the production printer.

25 Claims, 3 Drawing Sheets

SYSTEM AND METHOD FOR SELECTING A PROOF PRINTER FOR A GIVEN PRODUCTION PRINTER

BACKGROUND

The present disclosure relates to printing systems, more specifically, to a system and method for selecting a proof printer for a given production printer.

Print buyers or document designers do not always have access to digital production printers. As such, during the course of designing a document for subsequent printing using a production printer, the document designer creates proofs for visualizing how a final, production print will appear. These proofs are often created using any of a number of printers (DFE/IOT) more suitable for an office environment, such as a desktop inkjet device.

The created proofs generally set expectations for the designer or the print buyer as to the colorimetric attributes and final appearance of the production print. When the designer or print buyer likes a particular proof, an electronic application file corresponding to the particular proof is then submitted to a press or other facility having a production printer for producing a production print corresponding to the proof. Upon submission, the operator of the press is requested to "match" the proof, especially the colorimetric attributes of the proof, with the production print such that the production print substantially matches the proof. The colorimetric attributes refer to parameters and aspects which affect the color rendition of a print, such as brightness, contrast and hue.

Typically, an operator of a production printer has two options. One option is to explain to the designer or print buyer that the office or desktop printer that was used to create the proof produces prints which have different colorimetric attributes than the colorimetric attributes of prints produced by the production printer, and therefore, the calorimetric attributes of the print cannot be matched to the calorimetric attributes of the proof. The second option for the operator of the production printer is to use trial-and-error and attempt to set up the production printer with digital settings which would produce a production print which would more closely match the colorimetric attributes of the proof. This option requires the operator to spend time and effort to set up the production printer in an effort to closely match the colorimetric attributes of the proof.

The second option can be fruitless as there are typically physical limitations as to how close the color attributes can be matched. For example, the proof and the production print may have very different physical marking characteristics, e.g. inkjet versus toner, paper stock, and dye choices of colorants.

The operator of the production printer cannot usually make a "copy" of the proof, since the proof is likely to have lower IQ than what is available on the production printer (streaks, bands, error-diffusion dots, lower resolution, etc.), and may even be damaged (folded, scratched, etc.). There may also be document finishing options that are available in a "printer" mode, that are not available in a "copy" mode (e.g., signatures, imposition, slip sheets, tabs).

Additionally, even if the proof is not damaged, the operator of the production printer cannot simply scan the proof and use a visual display of the scanned proof in order to produce the production print. This is due to the different color spaces used by different devices. For example, the CMYK color space is the color space used for production printers and most color personal computer printers. The CMYK color space uses cyan, magenta, yellow and black inks on paper to absorb red, green and blue light. The remaining reflected light is the color perceived by the viewer. While the CMYK color space is the standard color space used by production printers, the Red-Green-Blue (RGB) color space is a personal computer's native color space.

Both RGB and CMYK color spaces are device-dependent color spaces; i.e., the colors rendered depend on the device that produces the colors. For example, the calorimetric attributes produced by a scanner vary from the calorimetric attributes visible on a monitor since a scanner uses a CCD (charge coupled device) array to capture colors, while a monitor produces colors from light-emitting phosphors. Additionally, the process of converting an image from the RGB color space to the CMYK color space generally compresses the colors into a smaller range.

The CMYK color space of one printer/device can vary significantly from the CMYK color space of another printer/device. Therefore, the CMYK color space of a first production printer can vary significantly from the CMYK color space of a second production printer. As such, ICC (International Color Consortium) profiles are frequently used to manage color between devices.

An ICC profile is a computer file that describes the color capabilities and the color space of a particular monitor, scanner, printer, printing press or color proofing device. ICC-based color management relies on two things: (1) device profiles, which characterize how individual devices produce color, and a color engine (also called a color matching module or CMM), which reads those profiles and translates and corrects colors between devices; and (2) LAB or XYZ calorimetric space, which arbitrates between color spaces of different devices. To simplify the discussion, we will only consider the LAB colorimetric space in the rest of this application. LAB calorimetric space is based on the way the human eye perceives color and is device independent. A LAB color engine translates RGB, CMYK and other color spaces to and from LAB, that is, a LAB color engine acts as an interpreter between different color spaces.

Most electronic documents to be printed or output on a particular device include multiple elements, such as text, photos, graphics and the like. Many electronic documents are a composite of other smaller documents and elements. For example, photos may be pasted into a large text document at different locations. Color graphics and monochrome images may occur on the same page of a document.

Accordingly, the individual elements of an electronic document that their calorimetric attributes are to be matched may be represented in a variety of color spaces; a situation which arises because the elements are derived from prior documents of differing origins. This situation may not be immediately apparent to the user, because the colors and other colorimetric attributes of the objects appear to match on the display or when printed using a straightforward color transformation process, such as is typical in ICC-based color management.

Currently, a remote proof can be created using an emulation mode on a remote proof printer. The emulation is performed by using the CMYK destination profile of the production run printer. The digital front end (DFE) of the remote proof printer converts the CMYK or RGB of the PDL job to the CMYK of the production run printer. This emulation CMYK is then converted to the CMYK of the remote proof printer for printing. If the gamut of the production and proof printer are significantly different (not unusual) the print on the remote proof printer will not be a good representation of the production run print.

Based on the above background information, there exists a need for a system and method for selecting the optimal proof printer for a given production printer.

SUMMARY

According to the present disclosure a method for selecting a printing device or proof printer for printing a proof is provided. The method includes providing a production printer and a plurality of proof printers and computing a native color gamut covered by the production printer and each of the plurality of proof printers. The method also includes calculating a gamut intersection volume between the production printer and each of the plurality of proof printers and comparing the gamut intersection volume between the production printer and each of the plurality of proof printers. The method further includes presenting a rating of the plurality of proof printers, the rating configured to provide data pertaining to the gamut intersection volume difference between each of the plurality of proof printers and the production printer.

The present disclosure also provides a system for selecting a printing device or proof printer for printing a proof. The system includes a production printer, a plurality of proof printers and application software configured to manage the flow of print jobs to the plurality of proof printers. The system further includes at least one processor capable of executing the application software for computing a native color gamut covered by the production printer and each of the plurality of proof printers; calculating a gamut intersection volume between the production printer and each of the plurality of proof printers; comparing the gamut intersection volume between the production printer and each of the plurality of remote proof printers; presenting a rating of the plurality of proof printers, the rating configured to provide data pertaining to the gamut intersection volume difference between each of the plurality of proof printers and the production printer; and selecting one of the plurality of proof printers for printing the proof based on the rating.

The present disclosure further provides a computer-readable storage medium storing a set of programmable instructions capable of being executed by at least one processor for performing the method of: computing a native color gamut covered by a production printer and each of a plurality of proof printers; calculating a gamut intersection volume between the production printer and each of the plurality of proof printers; comparing the gamut intersection volume between the production printer and each of the plurality of proof printers; and presenting a rating of the plurality of proof printers, the rating configured to provide data pertaining to the gamut intersection volume difference between each of the plurality of proof printers and the production printer.

BRIEF DESCRIPTION OF THE DRAWINGS

Various embodiments of the present disclosure will be described herein below with reference to the figures wherein.

DETAILED DESCRIPTION

Embodiments of the present disclosure will be described herein below with reference to the accompanying drawings. In the following description, well-known functions or constructions are not described in detail to avoid obscuring the present disclosure in unnecessary detail.

The word "printer" and terms "printing system", "proof printers" and "remote proofers" as used herein encompass any apparatus and/or system, such as a digital copier, xerographic and reprographic printing systems, bookmaking machine, facsimile machine, multi-function machine, etc. which performs a print outputting function for any purpose.

Figure 1:
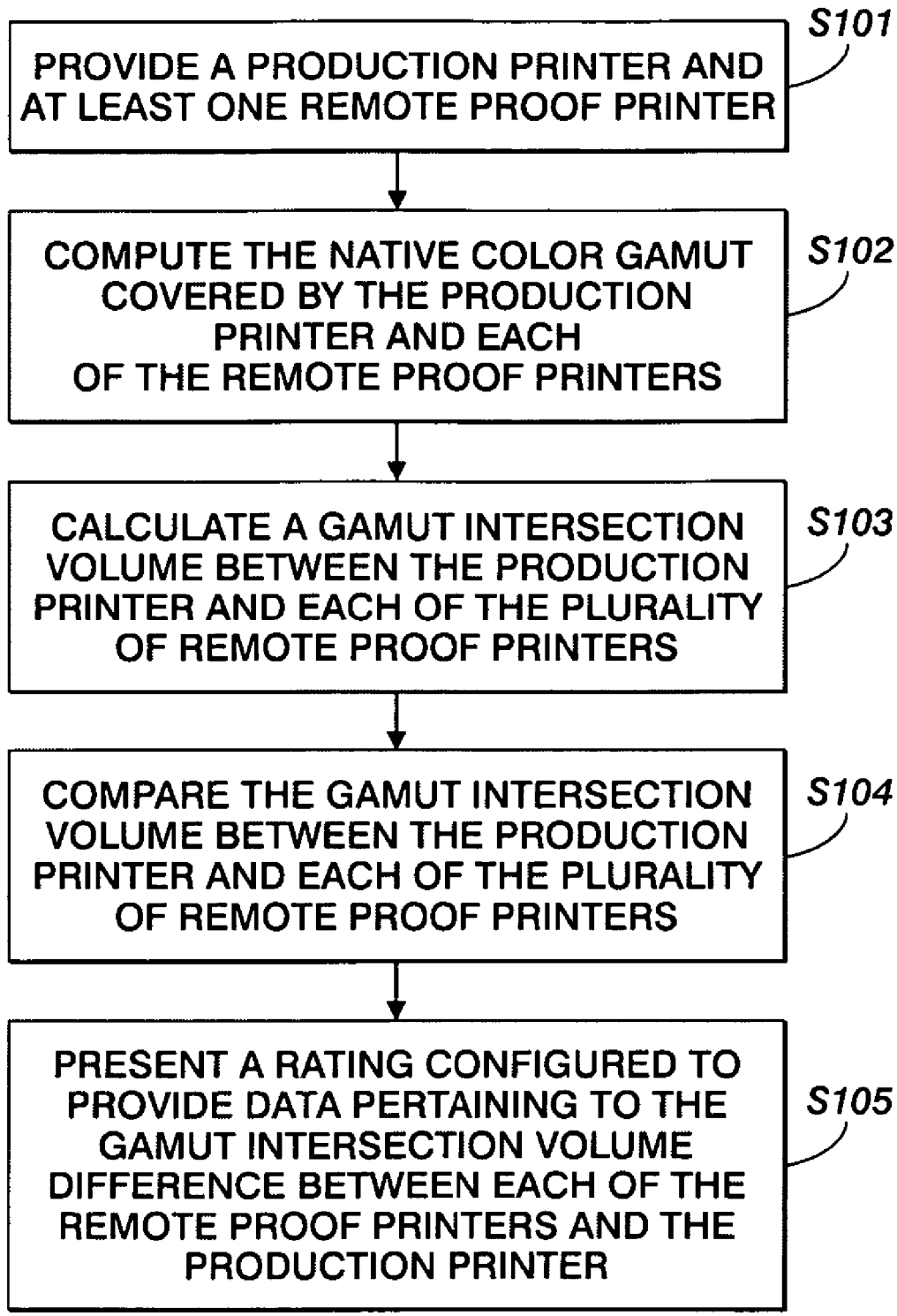
FIG. 1 is a flow chart illustrating a method in accordance with the present disclosure.

Referring to FIG. 1 a method for selecting a printing device or proof printer for printing a proof in accordance with the present disclosure is shown. The method includes providing a production printer and a plurality of remote proof printers or remote proofers (STEP 101). The plurality of remote proof printers may be used in conjunction with a network having a server and a series of client side devices operatively connected thereto.

The method also includes computing the native color gamut covered by the production printer and each of the plurality of remote proof printers (STEP 102). The native (non-emulation modes) CMYK color gamut covered by a printer class is computed using a spectral data application (SDA). It is envisioned that the gamut information may be shipped within the DFE code for each print engine. Alternatively, the gamut information could be stored in a memory device such as, for example, floppy disks, CD-ROM, flash-drives, hard drives, DVD, RAM, memory cards, diskettes, smart cards etc. Moreover, the gamut information could also be shipped or downloaded to a process manager which is described in greater detail hereinbelow.

The SDA is capable of receiving spectral data and converting it into color space data. Information regarding spectral data provides the most complete and precise means of describing a color, by specifying the amount of each wavelength that the sample reflects. Spectral data records the amount of reflected light, typically, in 10-nanometer or 20-nanometer bands. Furthermore, the SDA may also analyze specific color space data (e.g. color space volume, color space volume within a slice of the color space etc.). The SDA is configured to perform comparative operations such as computing volume differences between printer color spaces.

The process manager may be a client application (based on PDFs). The manager may reside in the print shop and could be configured to access any printer on the network. It is envisioned that the process manager could be utilized to route jobs to particular printers and to automate workflow in a shop. Moreover, jobs could be routed to appropriate printers based on standards or rules (e.g. print on a remote printer that fits, for a color perspective, the production printer). The workflow can be stopped for human intervention at defined "nodes". For example, one node could be a review step for choosing an appropriate proof device or for human review of the proof before initiating the production job.

The gamut intersection volume, for the production and each of the remote proof printers, is computed (STEP 103). The intersection volume is subtracted from the gamut volume of the production printer. The difference is the color space volume of the production printer that the remote proofer cannot reproduce.

If the volume difference value is zero, the remote proofer can reproduce all the colors of the production printer. If this is the case the user is informed, through a graphical user interface, that his/her selection of remote proofer is optimal for gamut. For volume differences greater than zero, the user is advised that the remote proofer will not cover all the colors that the production printer is capable of producing. Once the volume differences are computed, the gamut intersection volume between the production printer and each of the plurality of remote proof printers may then be compared (STEP 104).

The method of the present disclosure further includes a ratings system that rates the gamut volume shortfall of each of the remote proofers. The rating is configured to provide data pertaining to the gamut intersection volume difference between each of the remote proof printers and the production printer (STEP 105). For example, the gamut volume shortfall may be insignificant (small volume difference), significant (moderate volume difference) or unacceptable (large volume difference). Determinations on what constitutes a certain rating can be obtained from past testing results or customer studies. For each of these difference levels, the user is given the option to search for "a better gamut fit". If the user selects this option, the user is then asked if the gamuts to be used for comparison should be process manager stored gamuts, gamuts from accessible printers or both. The remote proof printer candidate(s) with the smallest gamut volume difference numbers are presented to the user as the optimal gamut choice(s). The user can then select the optimal gamut fitting remote proofer (i.e. proof printer). It is envisioned that the user could be shown the visually the gamut differences.

The gamut difference rating can be extended to use weighting factors for different regions/sections of color space. For example, equal volume differences in light colors and dark colors may be rated differently. The light color volume differences could be weighted higher (more objectionable) than darker volume differences. Other weightings could be applied to various hue volumes (e.g. green differences are less objectionable than red differences). The weightings could be hard-coded in by engineering testing or adjustable by a customer's preferences.

If the color space values are computed in CIELAB, the color difference formula CIE $\Delta E_{94}$ could be used to compute the volume difference rating/number. The difference in minimum $\Delta E_{94}$ between the gamut surface points of the bigger gamut (at least for one region of color space) production printer and the gamut surface points of the smaller gamut remote could be computed. The computation would be for a defined density of nodes on the bigger production gamut surface. An outlying point on the big surface would be given the value of the smallest $\Delta E_{94}$ difference to a point lying on the smaller gamut surface. The process would be repeated for points across the outlying production gamut surface. The values for the point would be added up resulting in a rating number.

It is envisioned that the present disclosure could enable users to determine the optimal fitting remote proof printer for certain specific sections of gamut (e.g., yellow hue colors, dark reds, dark colors, etc.). The gamut volume of a printer would need to be divided into appropriate volume sections for comparison to the production printer's equivalent color section. For example, a document may have a low compatibility between red and green colors but a high compatibility between blue colors.

Figure 2:
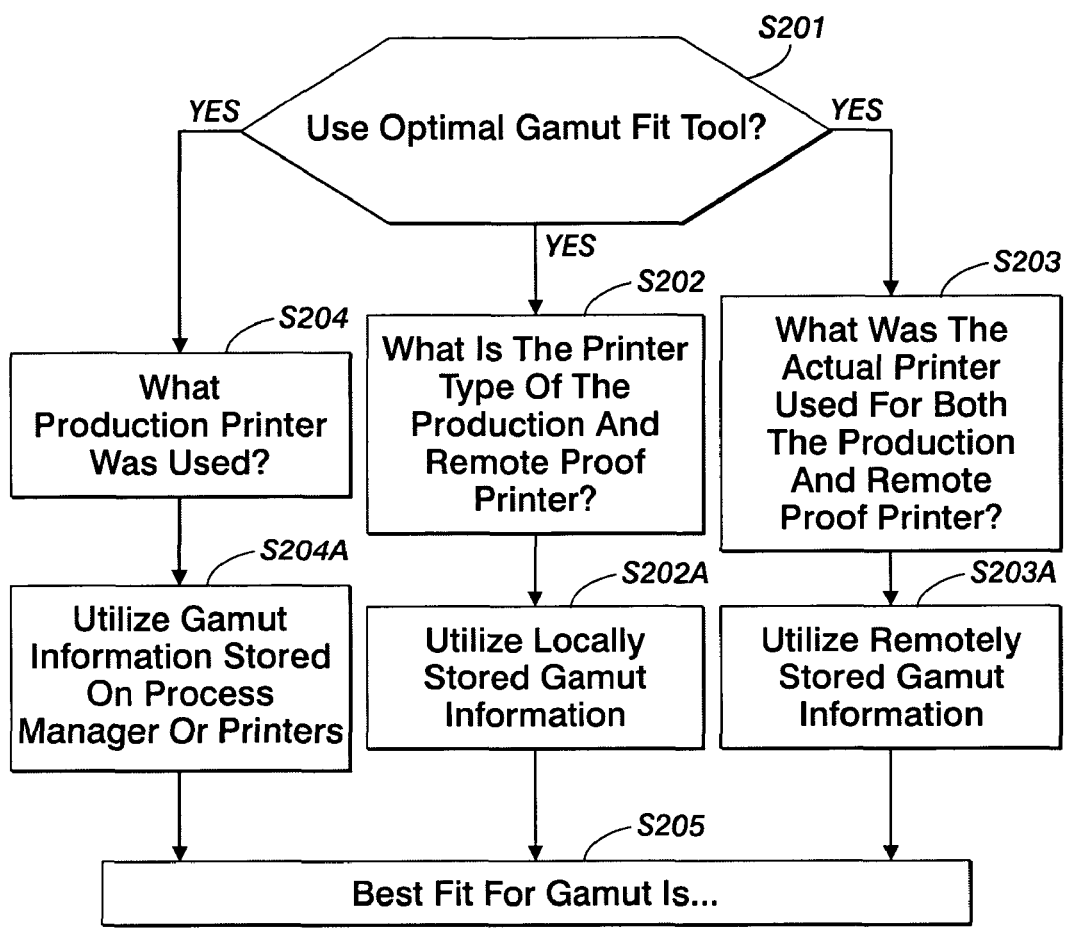
FIG. 2 is a flow chart illustrating a portion of the method of the present disclosure.
Figure 3:
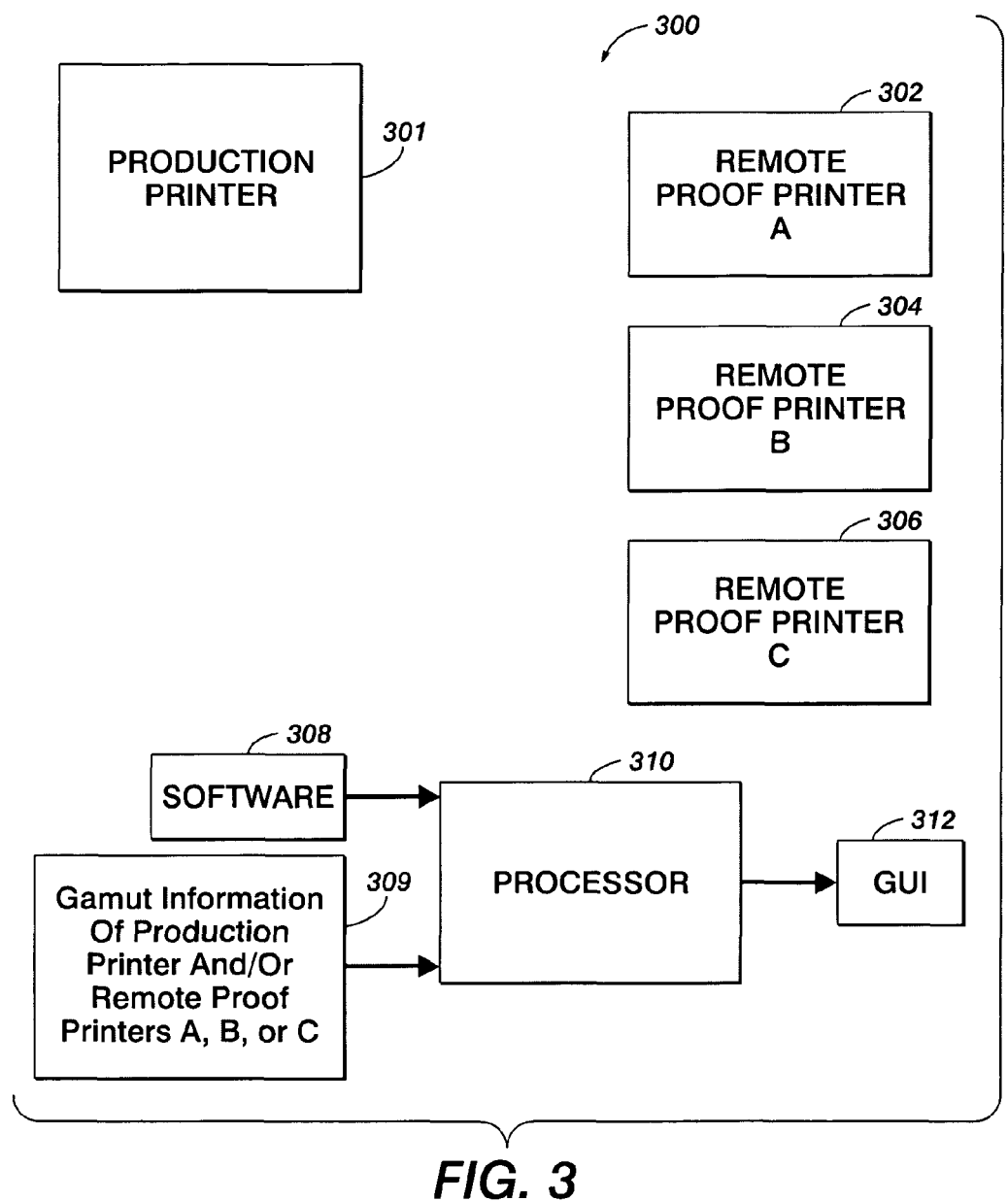
FIG. 3 is a diagram illustrating a system in accordance with the present disclosure.

Referring to FIG. 2, if the remote proof option within the process manager is invoked the user is asked if he/she wants to use the optimal gamut fit tool (STEP 201). If yes, the user is asked to specify at least one of the following:

1. The printer type for both the production printer and the remote proof printer (STEP 202). The process manager will use locally stored gamut information (STEP 202*a*);
2. The actual printer for both the production printer and the remote proof printer (STEP 203). This may have more up-to-date gamut information than that stored in the process manager. The process manager will use remotely stored gamut information (STEP 203*a*); and/or
3. The production printer only (STEP 204). In which case the user will be given advice on the best gamut fit from the proofer gamuts stored on process manager or the printers, with stored gamuts, accessible by the process manager. It is envisioned that the process manager may use remote or locally stored gamut information (STEP 204*a*).

Once the printer information is provided in one of the aforementioned steps, the user is presented with the printer that is the best gamut fit (STEP 205). It is contemplated that the best gamut fit may be presented in conjunction with a ratings system as described herein.

These techniques may be used in accordance with a system 300 for choosing the optimal printing device for a remote proof. System 300 includes a production printer 301 and a plurality of remote proof printers 302, 304 and/or 306. System 300 further includes application software 308 configured to manage the flow of print jobs to each of the plurality of proof printers 302, 304 and 306. The application software 308 could be housed within a client side PC, inside or outside a printer or on a computer readable storage medium such as a CD-ROM. The application software may include gamut information pertaining to production printer 301 and/or any or all of the remote proof printers 302, 304 or 306. Although three proof printers are shown in this embodiment, it is envisioned that any number of proof printers could be used.

System 300 may further include at least one processor 310 having a memory configured to perform the following steps: executing the application software 308 for computing a native color gamut covered by production printer 301 and the plurality of remote proof printers 302, 304 and 306; calculating a gamut intersection volume between production printer 301 and the plurality of remote proof printers 302, 304 and 306; comparing the gamut intersection volume between production printer 301 and the plurality of remote proof printers 302, 304 and 306; and presenting a rating of the plurality of remote proof printers 302, 304 and 306, the rating configured to provide data pertaining to the gamut intersection volume difference between each of the plurality of remote proof printers 302, 304 and 306 and production printer 301. Processor 310 may be operatively connected to a graphical user interface (GUI) 312 for presentation of the rating and/or selection of the optimal printing device. The rating may be based on differential weightings of the color space region.

It is envisioned that the application software may utilize either remote or locally stored gamut information. The application software utilized in accordance with the present disclosure, for example, may be located entirely on the client side. This could provide total analysis from a remote location and eliminates the need for a system administrator. The native color gamut information may be stored within a print engine. The techniques and devices described herein may be used entirely or partially on a network.

The techniques of the present disclosure may be hosted on a range of different client machines, e.g., the machine hosting the print submission client, the machine hosting an output management system, or an entirely different client side machine. This disclosure is intended to encompass all of these possible variations.

The aforementioned techniques may be used with a computer-readable storage medium storing a set of programmable instructions capable of being executed by at least one processor for performing the method of: computing a native color gamut covered by a production printer and a plurality of proof printers; calculating a gamut intersection volume between the production printer and the plurality of proof printers; comparing the gamut intersection volume between the production printer and the plurality of proof printers; and presenting a rating of the plurality of proof printers, the rating configured to provide data pertaining to the gamut intersection volume difference between each of the plurality of proof printers and the production printer. The computer-readable storage medium may include, but is not limited to, floppy disks, CD-ROM, flash-drives, hard drives, DVD, RAM, memory cards, diskettes, smart cards etc.

Many of the aforementioned techniques may be used to consider the shape of missing gamut or calculate the maximum gamut error for a certain proof. The techniques described above could be used to calculate the frequency of use of missing colors. Moreover, color difference metrics such as CIE $\Delta E_{94}$ or $\Delta ECMC$ could be used to describe the gamut shortfalls in terms of color perception (e.g. less able to perceive differences in dark blues vs. yellows).

It will be appreciated that variations of the above-disclosed and other features and functions, or alternatives thereof, may be desirably combined into many other different systems or applications. It is envisioned that the claims can encompass embodiments in hardware, application software or a combination thereof. Various presently unforeseen or unanticipated alternatives, modifications, variations or improvements therein may be subsequently made by those skilled in the art which are also intended to be encompassed by the following claims.

The invention claimed is:

1. A method for selecting a printing device for printing a proof, the method comprising:
   providing a production printer and a plurality of proof printers;
   computing a native color gamut by using a spectral data application, the gamut covered by the production printer and the plurality of proof printers, and including gamut information processed by a process manager, where the process manager is configured to operate based on one or more preset standards or preset rules;
   calculating a gamut intersection volume between the production printer and the plurality of proof printers via the spectral data application, wherein the spectral data application receives spectral data and converts the spectral data into color space data to specify an amount of each wavelength that a sample reflects;
   comparing the gamut intersection volume between the production printer and the plurality of proof printers;
   assigning a rating related to the plurality of proof printers, the rating configured to provide data pertaining to the gamut intersection volume difference between each of the plurality of proof printers and the production printer, wherein said rating use weighting factors for a different region, a different section of color space, and a hue volume; and
   allowing a user to search and select one or more gamuts for each assigned rating, the one or more gamuts provided by the process manager or the plurality of proof printers.

2. The method according to claim 1, wherein the native color gamut is CMYK.

3. The method according to claim 1, further comprising the step of:
   including the native color gamut within a print engine of one of the plurality of proof printers.

4. The method according to claim 1, further comprising the step of:
   dividing the gamut volume of each of the plurality of proof printers and the production printer into sections.

5. The method according to claim 4, further comprising the step of:
   comparing the sections to determine an optimal proof printer of the plurality of proof printers for certain sections of gamut.

6. The method according to claim 1, further comprising the step of:
   determining whether the gamuts used for the step of comparing are client application stored gamuts, gamuts from the plurality of proof printers, gamuts from the production printer or gamuts from both the plurality of proof printers and the production printer.

7. The method according to claim 1, wherein the step of assigning a rating includes ranking each proof printer based upon the difference between the gamut volume of the production printer and its respective intersection volume.

8. The method according to claim 1, further comprising the step of considering at least one of the shape of missing gamut, the maximum gamut error and the frequency of use of missing colors.

9. The method according to claim 1, wherein the spectral data application receives spectral data and converts the spectral data to color space data.

10. The method according to claim 9, wherein the spectral data includes an amount of each wavelength that the proof reflects.

11. The method according to claim 9, wherein the spectral data records an amount of light reflected from the proof.

12. The method according to claim 9, wherein the spectral data records an amount of light reflected, wherein said amount of light reflected is in the 10 nanometer band or the 20 nanometer band.

13. The method according to claim 1, wherein the process manager routes jobs to a particular printer and automates workflow in a shop.

14. The method according to claim 1, wherein the rating indicates a gamut volume shortfall of each remote proof printer.

15. The method according to claim 1, further comprising computing a color difference formula CIE $\Delta E_{94}$ to compute the volume difference, wherein the volume difference comprises a minimum $\Delta E_{94}$ between the gamut surface points of a larger gamut production printer and a gamut surface points of the smaller gamut, wherein an outlying gamut surface point on a larger gamut surface is assigned a value of a smallest $\Delta E_{94}$ difference to a point lying on the smaller gamut surface.

16. A system for selecting a printing device for printing a remote proof, the system comprising:
   a production printer;
   a plurality of remote proof printers;
   a network connecting the production printer and the plurality of proof printers;
   application software configured to manage the flow of print jobs to the plurality of proof printers; and
   at least one processor capable of executing the application software for computing:
      a native color gamut by using a spectral data application, the gamut covered by the production printer and the plurality of proof printers, and including gamut information processed by a process manager, where the process manager is configured to operate based on one or more preset standards or preset rules;
      calculating a gamut intersection volume between the production printer and each of the plurality of proof printers via the spectral data application, wherein the spectral data application receives spectral data and converts the spectral data into color space data to specify an amount of each wavelength that a sample reflects;

comparing the gamut intersection volume between the production printer and each of the plurality of proof printers;

assigning a rating related to the plurality of proof printers, the rating configured to provide data pertaining to the gamut intersection volume difference between each of the plurality of proof printers and the production printer, wherein said rating use weighting factors for a different region, a different section of color space, and a hue volume; and allowing a user to search and select one or more gamuts for each assigned rating, the one or more gamuts provided by the process manager or the plurality of proof printers.

17. The system according to claim 16, wherein the rating is based on a region of color space that is not covered by the plurality of proof printers.

18. The system according to claim 16, wherein the native color gamut is CMYK.

19. The system according to claim 16, wherein the native color gamut is included within a print engine.

20. The system according to claim 16, wherein the application software utilizes one of remote and locally stored gamut information.

21. A computer-readable non-transitory storage medium storing a set of programmable instructions capable of being executed by at least one processor for performing the method of:

computing a native color gamut by using a spectral data application, the gamut covered by the production printer and the plurality of proof printers, and including gamut information processed by a process manager, where the process manager is configured to operate based on one or more preset standards or preset rules;

calculating a gamut intersection volume between the production printer and the plurality of proof printers via the spectral data application, wherein the spectral data application receives spectral data and converts the spectral data into color space data to specify an amount of each wavelength that a sample reflects;

comparing the gamut intersection volume between the production printer and each of the plurality of proof printers;

assigning a rating related to the plurality of proof printers, the rating configured to provide data pertaining to the gamut intersection volume difference between each of the plurality of proof printers and the production printer, wherein said rating use weighting factors for a different region, a different section of color space, and a hue volume; and allowing a user to search and select one or more gamuts for each assigned rating, the one or more gamuts provided by the process manager or the plurality of proof printers.

22. The computer-readable non-transitory storage medium according to claim 21 further comprising the step of:
including the native color gamut within a print engine of one of the plurality of proof printers.

23. The computer-readable non-transitory storage medium according to claim 21 further comprising the step of:
comparing the sections to determine an optimal proof printer of the plurality of proof printers for certain sections of gamut.

24. The computer-readable non-transitory storage medium according to claim 21 wherein the step of assigning a rating includes ranking each proof printer based upon the difference between the gamut volume of the production printer and its respective intersection volume.

25. The computer-readable non-transitory storage medium according to claim 21 further comprising the step of:
determining the rating using a color difference computation.

* * * * *